United States Patent
Davis et al.

(10) Patent No.: US 8,533,025 B2
(45) Date of Patent: Sep. 10, 2013

(54) METHOD AND APPARATUS FOR MANAGEMENT OF SALES ACTIVITY INFORMATION

(75) Inventors: Peter A. Davis, Wayzata, MN (US); Mark A. Harvat, Jupiter, FL (US)

(73) Assignee: Quest Direct Corp, Wayzata, MN (US)

( * ) Notice: Subject to any disclaimer, the term of this patent is extended or adjusted under 35 U.S.C. 154(b) by 1447 days.

(21) Appl. No.: 11/828,091

(22) Filed: Jul. 25, 2007

(65) Prior Publication Data

US 2008/0027786 A1 Jan. 31, 2008

Related U.S. Application Data

(60) Provisional application No. 60/820,747, filed on Jul. 28, 2006.

(51) Int. Cl.
*G06Q 10/00* (2012.01)

(52) U.S. Cl.
USPC ........ 705/7.36; 705/7.38; 705/7.39; 705/7.42

(58) Field of Classification Search
None
See application file for complete search history.

(56) References Cited

U.S. PATENT DOCUMENTS

| | | | |
|---|---|---|---|
| 6,003,036 A | 12/1999 | Martin | |
| 6,067,525 A * | 5/2000 | Johnson et al. | 705/7.13 |
| 6,581,068 B1 | 6/2003 | Bensoussan et al. | |
| 6,760,727 B1 * | 7/2004 | Schroeder et al. | 1/1 |
| 6,804,657 B1 * | 10/2004 | Sultan | 705/7.31 |
| 6,868,389 B1 * | 3/2005 | Wilkins et al. | 705/7.29 |
| 6,941,305 B2 * | 9/2005 | Magouirk et al. | 1/1 |
| 7,043,531 B1 * | 5/2006 | Seibel et al. | 709/206 |
| 7,120,629 B1 * | 10/2006 | Seibel et al. | 1/1 |
| 7,155,424 B2 * | 12/2006 | Ikezawa et al. | 1/1 |
| 7,213,199 B2 * | 5/2007 | Humenansky | 715/209 |
| 7,213,232 B1 * | 5/2007 | Knowles | 717/121 |
| 7,216,087 B2 * | 5/2007 | Thompson et al. | 705/7.29 |
| 7,228,284 B1 * | 6/2007 | Vaillancourt et al. | 705/7.13 |
| 7,340,410 B1 * | 3/2008 | Vaillancourt et al. | 705/7.15 |
| 7,395,224 B1 * | 7/2008 | Todd | 705/26.43 |
| 7,499,870 B1 * | 3/2009 | Petrossi | 705/7.32 |
| 7,516,088 B2 * | 4/2009 | Johnson et al. | 705/16 |
| 7,526,439 B2 * | 4/2009 | Freishtat et al. | 705/26.41 |
| 7,546,248 B2 * | 6/2009 | Ellison et al. | 705/7.42 |

(Continued)

FOREIGN PATENT DOCUMENTS

| | | |
|---|---|---|
| WO | WO-2008014346 A2 | 1/2008 |
| WO | WO-2008014346 A3 | 1/2008 |

OTHER PUBLICATIONS

ACT! by Sage Premium for Workgroups 2007 (9.0). Sage Software SB, Inc. Release Sep. 2006. 1-338.*

(Continued)

*Primary Examiner* — Brett Feeney
(74) *Attorney, Agent, or Firm* — Schwegman Lundberg & Woessner, P.A.

(57) ABSTRACT

Systems and methods are described for management of sales activity information. In an embodiment, a system comprises a client system; and a server system, communicatively coupled to the client system, wherein the server system comprises: a client interface to receive sales activity data from the client system, wherein the sales activity is associated with a sales process and arranged using a multi-dimensional matrix; and a data storage system to store the sales activity data using a coordinate system that corresponds with the multi-dimensional matrix. Other embodiments are disclosed.

31 Claims, 9 Drawing Sheets

(56) References Cited

U.S. PATENT DOCUMENTS

| | | | |
|---|---|---|---|
| 7,584,115 B2* | 9/2009 | Sahagian | 705/7.29 |
| 7,620,564 B1* | 11/2009 | Lippock | 705/7.29 |
| 7,657,465 B2* | 2/2010 | Freishtat et al. | 705/26.41 |
| 7,743,017 B2* | 6/2010 | Ikezawa et al. | 707/608 |
| 7,747,545 B2* | 6/2010 | Gleim et al. | 706/8 |
| 7,899,707 B1* | 3/2011 | Mesaros | 705/14.66 |
| 2003/0004929 A1* | 1/2003 | Julian et al. | 707/2 |
| 2003/0028451 A1* | 2/2003 | Ananian | 705/27 |
| 2004/0064351 A1* | 4/2004 | Mikurak | 705/7 |
| 2004/0153368 A1* | 8/2004 | Freishtat et al. | 705/26 |
| 2005/0004837 A1* | 1/2005 | Sweeney et al. | 705/14 |
| 2005/0021348 A1 | 1/2005 | Chan et al. | |
| 2005/0055275 A1* | 3/2005 | Newman et al. | 705/14 |
| 2005/0108041 A1* | 5/2005 | White | 705/1 |
| 2005/0192831 A1* | 9/2005 | Ellison et al. | 705/1 |
| 2005/0256778 A1 | 11/2005 | Boyd et al. | |
| 2005/0267875 A1 | 12/2005 | Bentley | |
| 2005/0278281 A1* | 12/2005 | Samson et al. | 707/1 |
| 2006/0085255 A1* | 4/2006 | Hastings et al. | 705/14 |
| 2007/0033098 A1* | 2/2007 | Peters et al. | 705/14 |
| 2007/0088586 A1* | 4/2007 | Ikezawa et al. | 705/7 |
| 2007/0233730 A1* | 10/2007 | Johnston | 707/104.1 |
| 2007/0282650 A1* | 12/2007 | Jackness et al. | 705/7 |
| 2008/0103946 A1* | 5/2008 | Johnson et al. | 705/30 |
| 2008/0109286 A1* | 5/2008 | Johnson et al. | 705/7 |
| 2008/0140496 A1* | 6/2008 | Mink | 705/9 |
| 2008/0270148 A1* | 10/2008 | Morgen | 705/1 |
| 2008/0288889 A1* | 11/2008 | Hunt et al. | 715/810 |
| 2008/0294996 A1* | 11/2008 | Hunt et al. | 715/739 |
| 2009/0063232 A1* | 3/2009 | Lissack et al. | 705/8 |
| 2009/0164306 A1* | 6/2009 | Petrossi | 705/10 |
| 2009/0234710 A1* | 9/2009 | Belgaied Hassine et al. | 705/10 |
| 2009/0254423 A1* | 10/2009 | Ellison et al. | 705/11 |

OTHER PUBLICATIONS

Case Management Implementation Guide (2005). Salesforce.com. 1-24.*

Sugar Open Source version 4.5 (2006). SUGARCRM. Sep. 6, 2006. 1-104.*

"International Application Serial No. PCT/US2007/074360, Preliminary Report on Patentability mailed Jan. 28, 2008", 6 pgs.

* cited by examiner

| BUYING DECISIONS | APPROACH | QUALIFY | SUMMARY OF NEEDS | PRESENT | SOLUTION | ACTION | REINFORCE | DELIVERY |
|---|---|---|---|---|---|---|---|---|
| PERSON | | | | | | | | |
| COMPANY | | | | | | | | |
| PRODUCT/SERVICE | | | | | | | | |
| PRICE & TERMS | | | | | | | | |
| TIMING | | | | | | | | |

| BUYING DECISIONS | APPROACH | QUALIFY | SUMMARY OF NEEDS | PRESENT | SOLUTION | ACTION | REINFORCE | DELIVERY |
|---|---|---|---|---|---|---|---|---|
| PERSON | X | | | | | | | |
| COMPANY | | X | | | | | | |
| PRODUCT/SERVICE | | | | | | | | |
| PRICE & TERMS | X | | | | | | | |
| TIMING | X | | | | | | | |

COMMITMENT OBJECTIVE: MEET WITH VP

INTERACTION TYPES

RESULTS STATUS: ACHIEVED
REVISED COMMITEMENT: ---
NEXT STEP: MEET WITH CFO

CALL NOTES

METHOD AND APPARATUS FOR MANAGEMENT OF SALES ACTIVITY INFORMATION

RELATED PATENT DOCUMENTS

This application claims priority under 35 U.S.C. 119(e) from U.S. Provisional Application Ser. No. 60/820,747 filed Jul. 28, 2006, which is incorporated herein by reference.

TECHNICAL FIELD

Various embodiments described herein relate generally to computer systems, and more particularly, but not by way of limitation, to information technology and processes related to management of sales activity information.

BACKGROUND

Many businesses use electronic systems to manage relationships with customers and business assets. In general, customer relationship management (CRM) systems encompass tools that allow businesses to manage various interactions with potential and existing customers. Various CRM systems may support advertising, marketing, sales, and service associated with a businesses service or product offering. Related to CRM systems are enterprise resource planning (ERP) systems. An ERP system may be used to organize and manage business functions within an organization or across several organizations. An ERP system may incorporate a CRM system, in addition to supply chain management, warehouse management, human resources, decision support, accounting and financials, or manufacturing.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, example embodiments. These embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

System Overview

Figure 1:
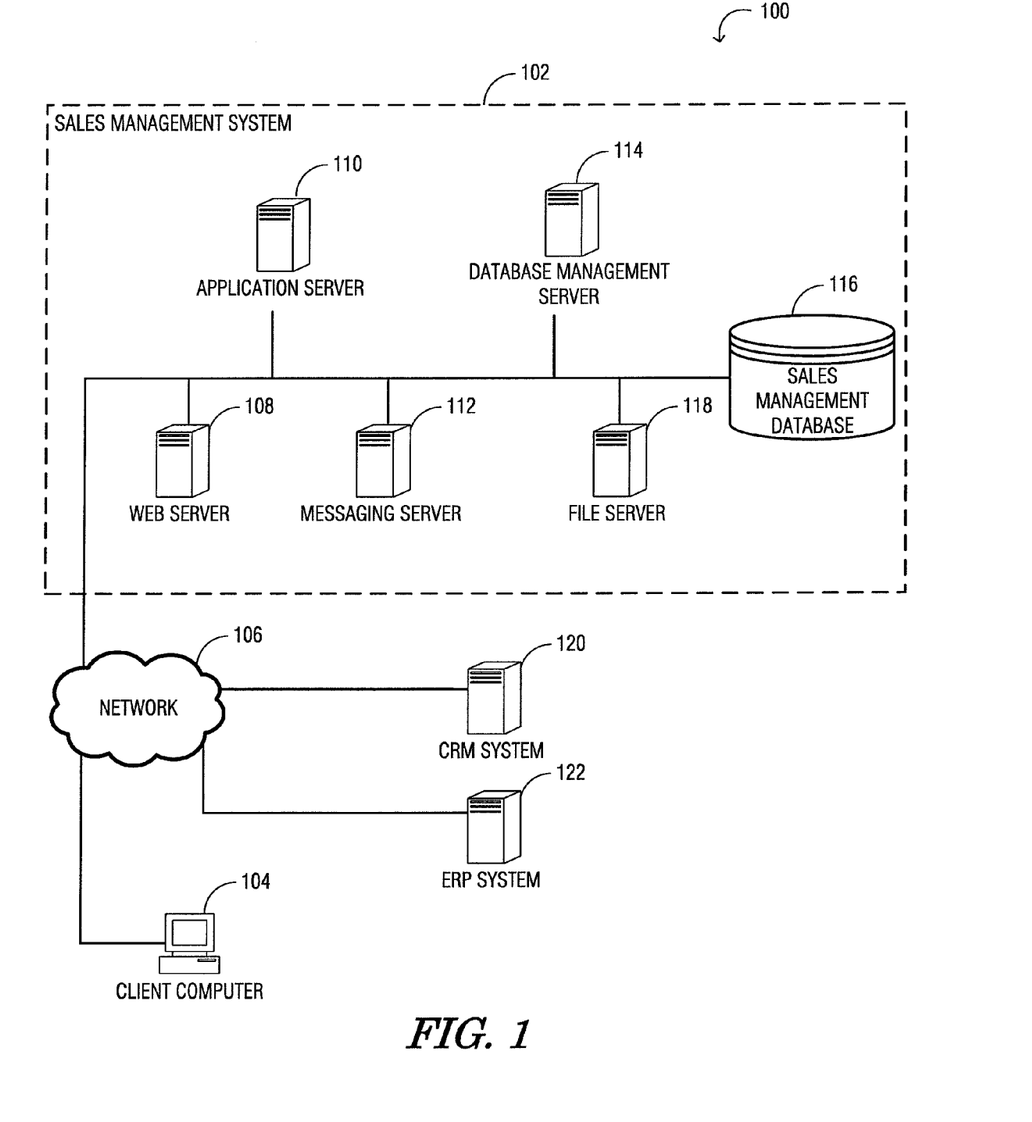
FIG. 1 is a schematic view of a computer network system according to various embodiments.

FIG. 1 is a schematic view of a computer network system 100 according to various embodiments. The computer network system 100 includes a sales management system 102 and a client computer 104, communicatively coupled via a network 106. In an embodiment, the sales management system 102 includes a web server 108, an application server 110, a messaging server 112, a database server 114, which is used to manage at least a sales management database 116, and a file server 118. The sales management system 102 may be implemented as a distributed system, for example one or more elements of the sales management system 102 may be located across a wide-area network from other elements of the sales management system 102. In addition, a customer relationship management (CRM) system 120 and an enterprise resource planning (ERP) system 122 are communicatively coupled to the sales management system 102 via the network 106.

The network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices coupled to the network 106 may be coupled to the network 106 via one or more wired or wireless connections.

The web server 108 may communicate with the file server 118 to publish or serve files stored on the file server 118. The web server 108 may also communicate or interface with the application server 110 to enable web-based presentation of information. For example, the application server 110 may include scripts, applications, or library files that provide primary or auxiliary functionality to the web server 108 (e.g., multimedia, file transfer, or dynamic interface functions). In addition, the application server 110 may also provide some or the entire interface for the web server 108 to communicate with one or more of the other servers in the sales management system 102, e.g., the messaging server 112 or the database management server 114.

The sales management database 116 may include data to administer, track, audit, and provide reports on one or more sales opportunities. For example, the sales management database 116 may be structured to include some or all of the following information: a sale identifier (e.g., a title, a description, an invoice number), tracking data (e.g., creation date, last modified date, identities of persons who viewed or modified the record), a database record type, an author, scoring information (described in more detail below), resource information (e.g., resources used, percent or amount of a resource used), and other characteristics (e.g., encryption or security, archival status). The sales management database 116 may be implemented as a relational database, a centralized database, a distributed database, an object oriented database, or a flat database in various embodiments.

The CRM system 120 may include various commercial solutions, such as those provided by Microsoft of Redmond, Wash.; SAS of Cary, N.C.; and salesforce.com of San Francisco, Calif. Some CRM systems 120 may be developed, in whole or in part, within the company or business entity employing the CRM system 120. Similarly, ERP systems 122 may be off-the-shelf or developed in-house. Examples of popular commercial ERP systems 122 include those provided by SAP of Walldorf, Germany; and International Business Machines (IBM) of Armonk, N.Y.

The client computer 104 may include a laptop computer, portable computer, personal digital assistant (PDA), mobile telephone (e.g., cellular telephone), desktop computer, or other specialized computing device (e.g., a kiosk). The client computer 104 may interface with the systems described using a standardized protocol or a proprietary protocol to communicate in a secured or unsecured manner over the network 106. For example, the client computer 104 may connect with the sales management system 102 using Secure Hypertext Transfer Protocol (e.g., HTTPS) over a Transmission Control Protocol/Internet Protocol (TCP/IP) network. As another example, the client computer 104 may connect with the sales management system 102 using a virtual private network (VPN).

In an embodiment, a user (not shown) at a client computer 104 may interface with the sales management system 102, such as by using the web server 108. The user may interact with the sales management system 102 to input or provide information, such as a sales opportunity status. The user may also interact with the sales management system 102 to request and view reports, communicate with other users of the sales management system 102, or access existing records in the sales management system 102.

Example Embodiments

A sales situation exists when there is an interaction between a seller and a potential buyer. The seller may be a company who wishes to sell a product or service. The potential buyer may be a potentially new customer or an existing customer. The customer may be a business entity, such as another company, a school, a private business, an individual, or the like.

An outcome from a sales situation may include an expenditure of a resource (e.g., time or money) by the potential buyer. The outcome may also include a change of state. The change of state may be represented by a creation or removal of a duty to act (e.g., a responsibility to follow up with additional information) or other change of context, such as an indicia of a result of the sales situation.

Systems may be used to record and analyze data related to such sales situations. Existing systems may represent or characterize a sales situation and the associated outcome using nomenclatures, such as a sales stage or a sales milestone. These abstractions may not properly identify or characterize the data to be efficiently used in other analysis.

Figure 2:
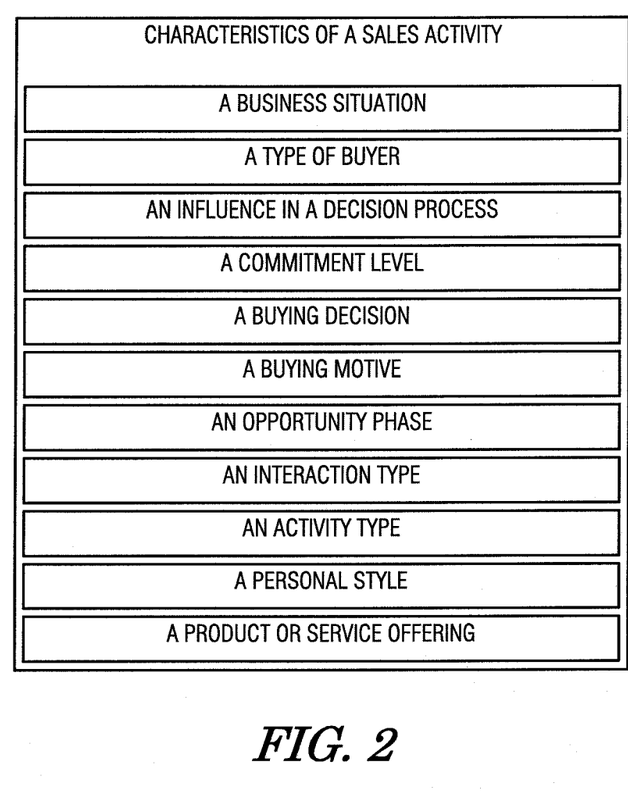
FIG. 2 is a chart illustrating characteristics of a sales activity according to various embodiments.

FIG. 2 is a chart illustrating characteristics of a sales activity according to various embodiments. In embodiments, a sales activity may refer to an activity or a series of activities related to an ongoing sales process. In the example embodiment shown, there are eleven characteristics including: (1) a business situation, (2) a type of buyer, (3) an influence in a decision process, (4) a commitment level, (5) a buying decision, (6) a buying motive, (7) an opportunity phase, (8) an interaction type, (9) an activity type, (10) a personal style, and (11) a product or service offering. In an embodiment, the eleven characteristics may be represented as variables in a sales record and be recorded, such as in the sales management database 116. By recording data associated with the eleven characteristics depicted in FIG. 2, sales situations and outcomes (e.g., state changes) can be recorded in a comprehensive structure. This comprehensive structure may be normalized and used as a basis for more rigorous accountability and business process. For example, the comprehensive structure may be used to evaluate a given sales situation against a company's definition or understanding of a best practice or best selling practice.

Referring to FIG. 2, a business situation may include a profile of a business who may be a potential client or customer. The profile may include a general purpose description for the type of business opportunity, such as characteristics of a decision process likely to be used, a budget, a timing consideration, a contact person, or other personnel associated with the business opportunity. The business situation may also include aspects of the business itself, such as a business type (e.g., corporation, partnership, individual), a business market, a business model, or the like.

The second characteristic, a type of buyer, illustrated in FIG. 2, may be characterized a person's role, title or responsibility in the decision process or professional perspective regarding the buying process. The type of buyer may also be characterized with respect to a timeframe, such as a short-term buyer. Furthermore, the type of buyer may also be characterized using a buyer's state of mind or emotional state, such as motivated, passive, non-committal, or the like.

The third characteristic, an influence in a decision process, may be characterized using one or more external or internal influences or pressures that a buyer may exert in a buying situation. For example, a person may not be the ultimate decision maker but may be considered to be an important influencer in the decision process, for example, the person may make recommendations as to which company or product is ultimately chosen by the organization. Other types of influences are included in the third characteristic.

The fourth characteristic, a commitment level, may include a subjective or objective measurement of a buyer's commitment to complete a sales activity. The commitment level may be demonstrated by an investment in resources (e.g., time or money) to continue the buying process. For example, a commitment to assemble a group of people to listen to a presentation, a verbal commitment to try the company's product or service, an agreement to review marketing materials, and a date for a follow up telephone discussion are all examples of a commitment a person makes to move the buying process along. These commitments, along with others, may be reduced to a indicator to represent the commitment level of the buyer's commitment to complete the sales activity.

The fifth characteristic, a buying decision, may include strategic or tactical reasons or foundations for a particular sales situation. In an embodiment, a buying decision is further deconstructed into five sub-characteristics: a person, a business entity, a product or service, a price and terms, or a timeframe. In an embodiment, a buying decision is used as a dimension in a multi-dimensional matrix used to capture and record data related to a sales situation.

The sixth characteristic, a buying motive, may include personal or professional reasons or foundations for a particular buying decision. The buying motive may be very closely related to a buying decision.

The sixth characteristic, a buying motive, represents the unmet needs of the buyer or buyer's organization and may include personal or professional reasons or foundations for a particular buying decision. For example, the needs of a person or the company itself are often described through compilations of one or more likes, dislikes, specifications, and business requirements.

The seventh characteristic, an opportunity phase, may include identifiers used by an organization to capture the progression of a business opportunity toward a successful consummation of a sale. The identifiers may pre-exist or already be in use by an organization and be imported or incorporated into the seventh characteristic. Terms or phrases such as "early development," "getting to know," "met with," "lunch and learn," "proposal review," and "close" may be used to indicate a progression during a selling process. A sales company may use fewer or more phases to describe how a prospect moves through their existing selling process.

The eighth characteristic, an interaction type, may include a series of steps, stages, or phases of a communication interaction that takes place during a sales activity. In an embodiment, a communication interaction may be characterized as an communication step comprising relationship building, questioning, summarizing needs, presentation, illustrating a solution that satisfies the summarized needs, buyer action(s), ensuring buyer satisfaction, and delivering a product or service. In an embodiment, the interaction type is used as a dimension in a multi-dimensional matrix used to capture and record data related to a sales situation.

The ninth characteristic, an activity type, may include identifiers such as "phone call," "email," "face-to-face meeting," or "demonstration," to indicate an interaction related to a sales situation. Other activities may include letter writing, presentations, outings, meals, walk-in's, drop by advertising, printed article, webinars, conferences, discovery sessions, research, internal meetings, administration, or the like.

The tenth characteristic, a personal style, may include various aspects of inter-personal skills, such as communication types, behavioral interactions and compatibility, personality types, communication styles, or attributes associated with a communication style.

The eleventh characteristic, a product or service offering, may be described using a label or other identifier (e.g., a stock keeping unit (SKU) and may include descriptions of products or services offered for sale, lease, or rent. For example, a product or service may be offered with a discrete part number that corresponds to existing codes in an ERP system. As another example, the product or service may be offered in other transactions such as a licensing arrangement.

While the use of all eleven characteristics is useful to fully describe a sales activity, two characteristics may be used in a particular manner to measure the effectiveness or progress of a sales activity. The two characteristics are the fifth characteristic, the buying decision, and the eighth characteristic, the interaction type. By arranging these two characteristics in a matrix, data can be normalized and used for business rules coding, graphical representation and further interpretation. Moreover, the state changes between two time periods can be used in further analysis and interpretation.

Figure 3:
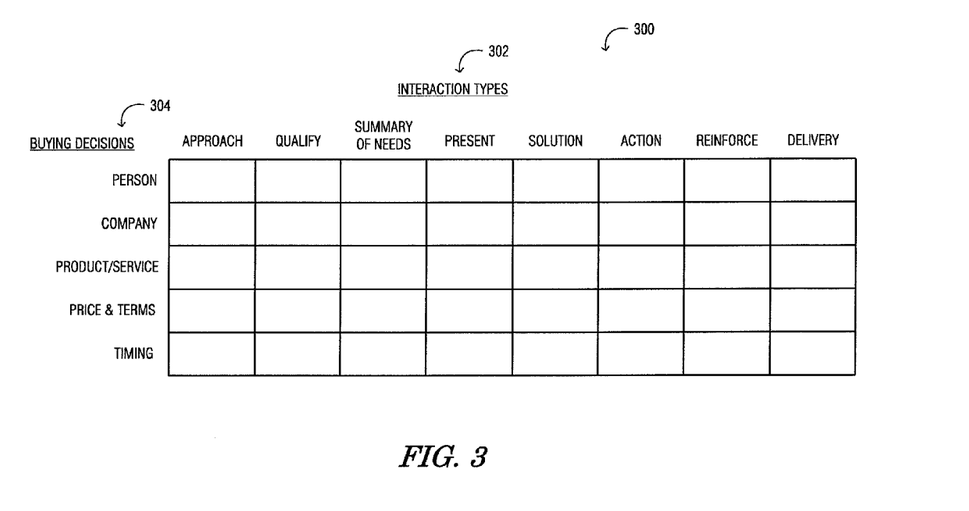
FIG. 3 is a matrix illustrating interaction types arranged against buying decisions according to various embodiments.

FIG. 3 is a matrix 300 illustrating interaction types 302 arranged against buying decisions 304 according to various embodiments. Each cell in the matrix 300 represents a sales activity context (e.g., state), which can be recorded as a discrete element representing the sales activity at a particular moment in time. In the example illustrated, the matrix 300 includes eight cells horizontally and five cells vertically, to create a forty cell matrix. Each cell in the matrix 300 may be considered as representing a resulting state for a previous sales activity.

The matrix 300 may be used by sales personnel to record a particular sales activity. In addition, the matrix 300 may be used by sales management to generate reports or report on the current state of a particular sales opportunity. In an embodiment, the matrix 300 is presented to a user of a client computer 104 via web server 108. The data may be aggregated or accumulated using the (x, y) coordinate data across multiple activities.

Using a simplified interface, such as the matrix illustrated in FIG. 3, may have advantages, such as encouraging a sales person to identify and record a state change form an activity transaction, which may further reinforce a positive cultural instinct for recording the sales transaction as it happens. The normalized, structured data that is recorded may have advantages, such as increased data integrity and easier interpretation of reports based on such data.

Figure 4:
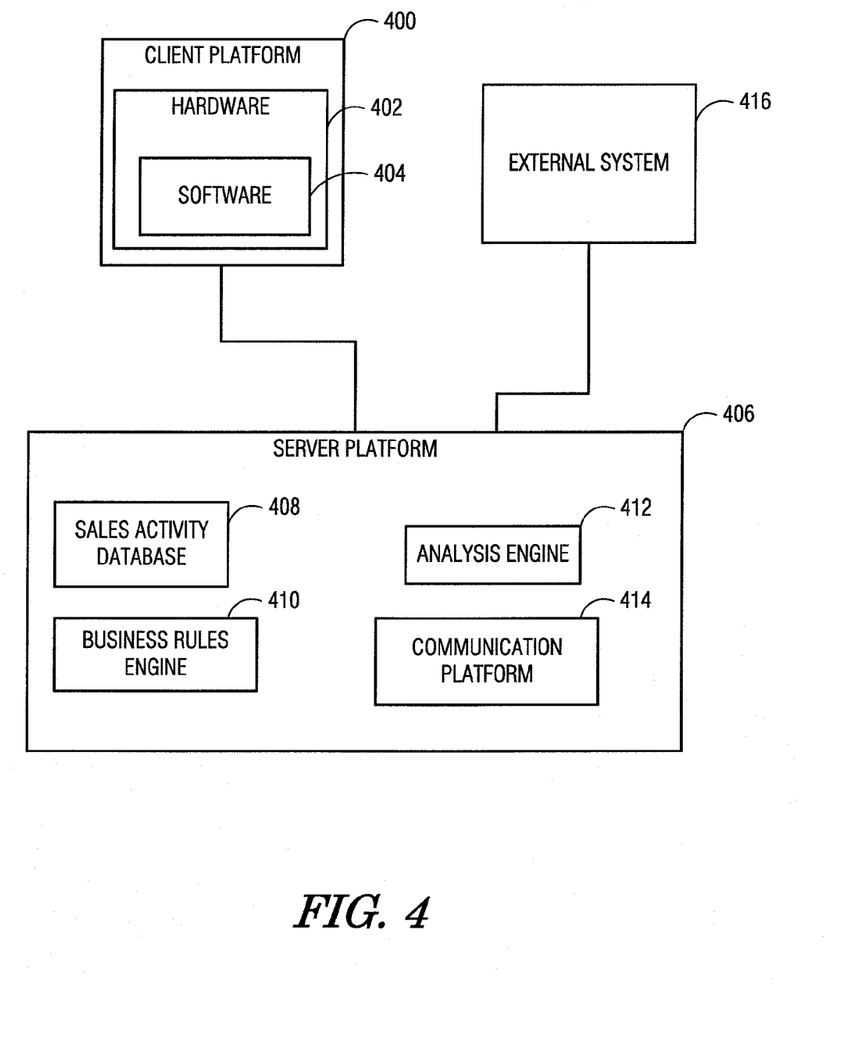
FIG. 4 is a schematic diagram illustrating a client and server platform used to manage sales activity information according to various embodiments.

FIG. 4 is a schematic diagram illustrating a client and server platform used to manage sales activity information according to various embodiments. A client platform 400 may include an electronic hardware device (e.g., a PDA, a mobile or desktop computer) and a software layer. The software layer may include a client interface to record sales activity information. Sales activity information may include activity related to a meeting, a telephone call, an email correspondence, or other communication, which indicates commitment to a step in a sales process. To record such information, the user may be presented with a user-interface, such as one illustrated in FIG. 6.

Figure 6:
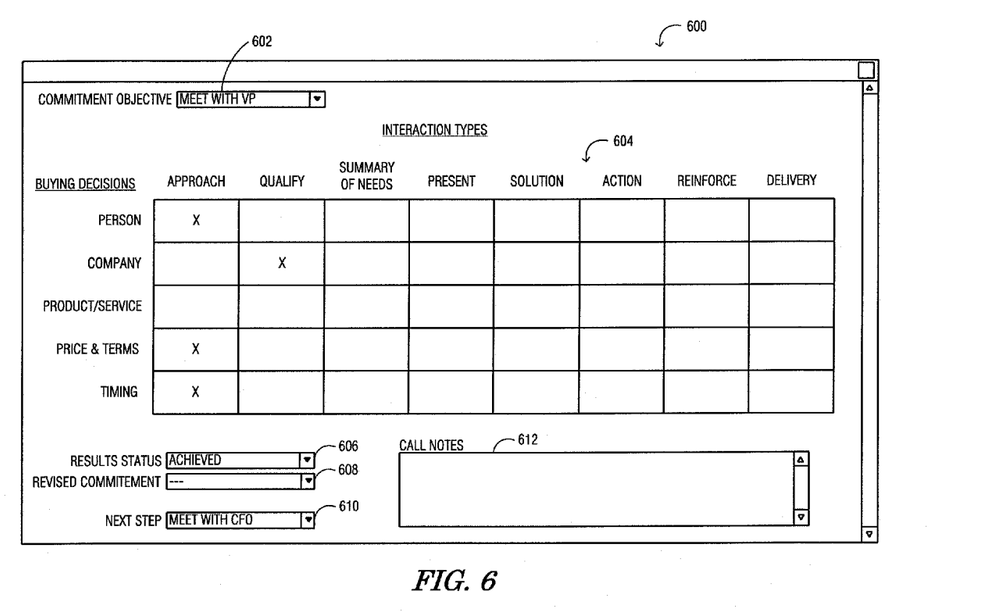
FIG. 6 illustrates a user-interface according to various embodiments. The user may be presented with choices.

FIG. 6 illustrates a user-interface 600 according to various embodiments. The user-interface may collect or present data from a salesperson after an interaction with a prospect or client. In an embodiment, the user is presented with five standard data inputs and an optional sixth data input. The user-interface 600 includes a commitment objective control 602, a status matrix 604, a results status control 606, a revised commitment objective control 608, a next step control 610, and a call notes control 612. In various embodiments, the user-interface 600 may be presented in a single page or frame, or across several pages or frames (e.g., in a wizard-like presentation).

The commitment objective control 602 may be a drop-down control containing a normalized list of commitment objectives, such as setting up a subsequent meeting or presentation, reviewing literature, scheduling a later phone call, attending a conference, or marking a specific activity (e.g., send order to purchasing, attend presentation, respond to phone message). A user may select a commitment objective known prior to the engagement or alternatively, a system may provide the commitment objective from memory. For example, in a previous interaction with the client, the user may have established the commitment objective for a subsequent interaction, which may then be used as the initial commitment objective in the current interaction. Generally, the commitment objective represented in this control 602 is information expressed from the buyer's perspective as an agreement to undertake certain actions at a later point in time, which abstractly reflects increasing levels of confidence that an interaction between the seller and (potential) buyer will lead to a success conclusion.

The status matrix 604 includes two axes corresponding to characteristics of a sales activity, as described with respect to FIG. 2. In an embodiment, the status matrix 604 includes a first axis that corresponds with the interaction type (e.g., the communication step) and the buying decision. The status matrix 604 includes eight cells horizontally and five cells vertically, to create a forty cell matrix. Each cell in the status matrix 604 may be considered to represent a state in the sales activity.

The eight horizontal cells in the status matrix 604 may be used by a sales person to record what step or steps in the communication process were completed. A user interface design will permit the author of the record to configure the response based upon a simple interface describing stopping points signifying where the activity was ended. Each step has a corresponding definition describing a context state for that step.

The five vertical cells in the status matrix 604 may be used to record the favorable buying decisions for the corresponding interaction type (communication step). This declaration can be validated by queries to the database with respect to the availability of other types of information from within the CRM system. The sales person declares what buying decisions have been made. In an embodiment, the test for a completed purchase is made when all five buying decisions are marked and certain interaction types are valid.

The results status control 606 may be used to record the results of the interaction with the buyer (or potential buyer). The results status control 606 is represented in FIG. 6 using a drop-down control; however, other types of controls could be used, such as a radio button cluster or a list control. The results status control 606 is normalized and standardized. This structural data representation may provide more accurate and easier reporting and other data manipulation. In an embodiment, the results status control 606 may be set to take on the value of "Achieved," "Failed to Agree," "Failed to Raise," and "Partial Agreement—Follow up."

The revised commitment objective control 608 may be a control that mimics the function and content of the commitment objective control 602. The revised commitment objective control 608 may be used when the commitment specified in the commitment objective control 602 is not obtained. In an embodiment, the revised commitment objective control 608 is disabled unless the results status control 606 indicates a value other than "Achieved," which may indicate a failure or other short-coming of the engagement.

The next step control 610 may include one or more standardized descriptions of follow-up steps that logically occur after the completion of the current commitment. The next step control 610 may be provided using a drop-down user-interface control. Other types of user-interface controls may be used, such as radio buttons or list controls. The next steps control 610 may include follow-up steps that are organized using standardized descriptions to enable high-quality data regularity and normalization. Examples of follow-up steps that may be presented in the next step control 610 include "Prepare Proposal," "Write Letter," "Send Out Memo," "Write Cal Report," "Send Attachments," "Schedule Demonstration," "Send Literature," "Make Follow-up Call," "Send Thank You," "Schedule Install/Implementation," and "Call for Appointment." The follow-up steps may be pre-populated using a standard model or may be dynamically populated, for example, by using a business rules engine to determine the next step according to a business rule or a best practice.

The call notes control 612 may include a text input field to record notes related to the particular interaction. The text input field may accept any alphanumeric input. In some examples, the text input field may be limited (e.g., 600 characters).

While each of the five standard fields 602-610 are described using standardized input descriptions, the term "other" or another similar catch-all phrase may be in a list, but this does not then lend itself to data normalization.

The envelope of the activity will typically already contain certain minimum information such as the name and company for which this record is intended to be associated to. The creation of the record itself can be initiated by the selection of a name from a pre-populated list, or the creation of a new name which can be communicated with the other portions of the sales activity information record.

Referring again to FIG. 4, in an embodiment, the client platform 400 includes a client computer 104, and may be used by a user to connect with a server platform 406 (e.g., the sales management system 102). The server platform 406 may include a sales activity database 408, a business rules engine 410, an analysis engine 412, and a communication platform 414. The record of a sales activity interaction may be received by the server platform 402 via the communication platform 414. The record may be stored in the sales activity database 408. In an embodiment, the data corresponding to the matrix (e.g., FIG. 6 at 604) may be stored using a coordinate system (e.g., (x, y) coordinates). The coordinate data may be used in later processes, such as business rules coding, graphical representation, or further interpretation or processing.

The analysis engine 412 may query an external system 416 (e.g., the CRM system 120 or ERP system 122 in FIG. 1) to append data to the raw data stored in the sales activity database 408. The query may occur at regular or scheduled intervals. Queried data may include one or more transaction logs from other systems. Queried data may also include a pre-defined process step that is mapped to an (x, y) coordinate corresponding to the data stored in the sales activity database 408 obtained from the matrix, or values for other characteristics (other than those captured with respect to the fifth and seventh characteristics as described above with reference to FIG. 2). The queried data may be organized and stored in a master transaction journal as described below with reference to FIG. 5.

Figure 5:
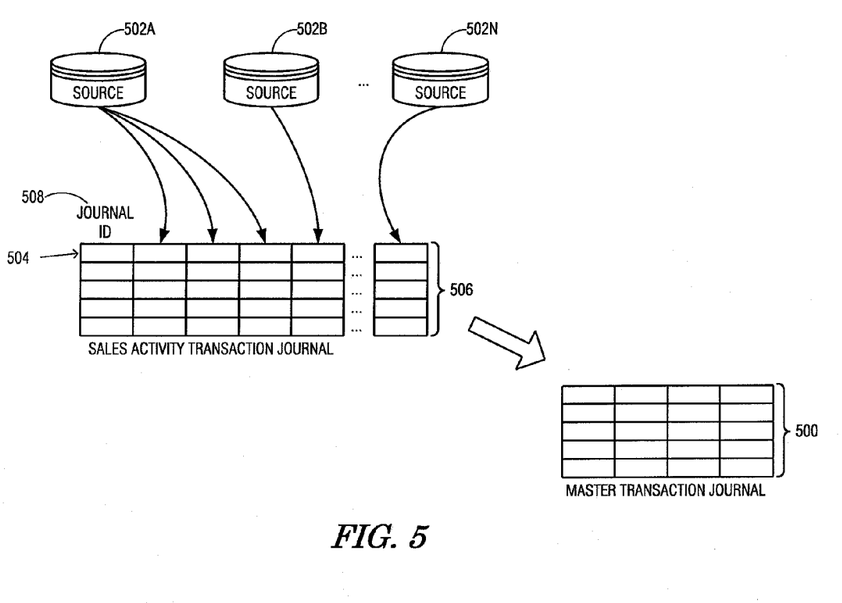
FIG. 5 is a schematic diagram illustrating data flow when constructing a master transaction journal according to various embodiments.

FIG. 5 is a schematic diagram illustrating data flow when constructing a master transaction journal 500 according to various embodiments. In an embodiment, data from a first source 502A is inserted into a record 504 in a sales activity transaction journal 506. The data from the first source 502A may include one or more transaction logs that contain some, but not all, of the data described with reference to structures in FIG. 7. The data may be imported into the record 504 and identified using a unique journal number 508. Data may also be obtained from one or more additional sources 502B . . . 502N, as is further described below.

The imported transaction logs may be processed by the analysis engine 412. For example, the analysis engine 412 may test data in a transaction log for its type and either (1) mark the record 504 as completed and then post the record 405 to the master transaction journal 500 according to one or more rules established for that data structure or (2) mark the record 504 as an incomplete transaction and record a debit against the record 504. During later processing, when the analysis engine 412 processes an incomplete (debit) transaction, the analysis engine 412 may run a query to obtain one or more missing field values. For example, the analysis engine 412 may query sources 502B through 502N. For each data value the analysis engine 412 obtains, a credit can be recorded against any outstanding debits associated with the record 504. As a later processing step, the analysis engine 412 may then calculate whether the debit has been eliminated for a particular record 504, and if so, the record 504 is marked as having the transaction complete and then posted to the master transaction journal 500. In an embodiment, a process called check summing is used to determine whether outstanding debits are satisfied by any credits associated with the record 504.

Certain data in the record 504 may represent changes to a state value or a numerical accumulator. Such changes may be implemented by the business rules engine 410 and completed without any interaction with the master transaction journal 500.

In an embodiment, a record 504 representing an incomplete transaction may be posted to the master transaction journal 500 in its incomplete form to satisfy external business needs or requirements. For example, some data may be considered non-essential, in which case, if it is determined missing or unobtainable for a threshold period of time, the record 504 may be marked as complete and posted to the master transaction journal 500.

Referring again to FIG. 4, the analysis engine 408 may then interface with the business rules engine 410 to determine whether a resulting transaction, now posted to the master transaction journal represented in the sales activity database 408, should trigger another event, query or task to be initiated. The analysis engine 412 may also perform consistency checks, for example, by determining whether an activity in the sales activity database 408 conforms to a previously described sequence of coordinate geometry and its result codes. In addition, the analysis engine 412 may determine whether the end point of a geometry of the activity triggers a change in the expression of probability with in the business pipeline according to a defined limit. In addition, the analysis engine 412 may determine, with help from the business rules engine 410, what does the next step selection imply based on a comparison with established dimensions depicting best practices within a sales skills methodology previously captured with respect to a combination of coordinate data and next action steps. Some or all of the information determined by the analysis engine 412 may be stored in the sales activity database 408 and associated with a particular record.

The analysis engine 412 may then communicate the sales activity record from the sales activity database 408 to the external system 416 (e.g., CRM or ERP system) using the communication platform 414. For example, the analysis engine 412 may send a copy of data from the sales activity record in the sales activity database 408 to a CRM or ERP system. As another example, the analysis engine 412 may send data to update an existing record in a sales activity record in the external system 416.

Figure 7:
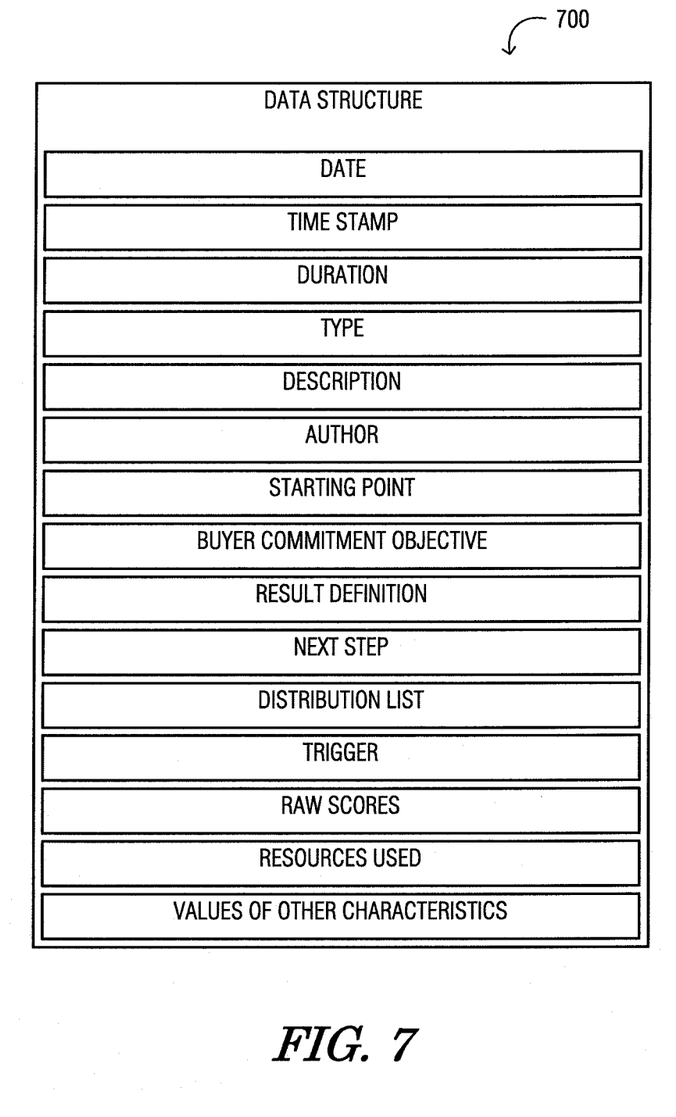
FIG. 7 illustrates a data structure according to various embodiments.

FIG. 7 illustrates a data structure 700 according to various embodiments. The data structure 700 may be representative of a record in a database (e.g., the sales activity database 408). The data structure includes a date, a time stamp, a duration, a type, a description, an author, a starting point (e.g., defined using an (x, y) coordinate associated with the matrix as described in FIG. 3), a buyer commitment objective (what buyer commitment was targeted), a result definition (what buyer commitment was achieved, this may be represented using the (x, y) coordinate system as described above), a next step (which may be selected from a pre-defined list in some embodiments), a distribution list to send the completed transaction to, a trigger, other raw scores, resources used, and optionally one or more of the values for other characteristics (other than those captured with respect to the fifth and seventh characteristics as described above with reference to FIG. 2).

Figure 8:
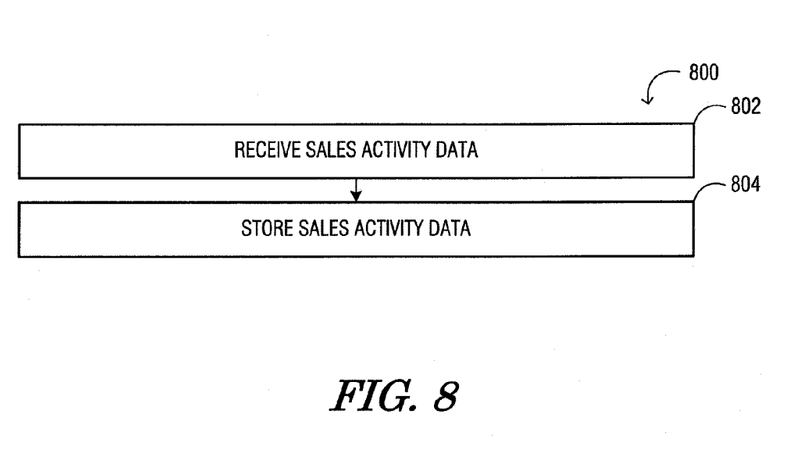
FIG. 8 illustrates a method according to various embodiments.

FIG. 8 illustrates a method 800 according to various embodiments. At 802, sales activity data is received at a server system from a client system. The client system may include a mobile computing device, in an embodiment. In a further embodiment, the mobile computing device may include a personal digital assistant (PDA), a laptop computer, a specialized device, or a telephone. The sales activity data is associated with a sales process and arranged using a multi-dimensional matrix, in an embodiment. The multi-dimensional matrix is a two-dimensional matrix in an embodiment, and comprises a first dimension and a second dimension. The first dimension may correspond with an aspect of a buying decision and the second dimension may correspond with an interaction type. In other embodiments, the multi-dimensional matrix may be composed of three or more dimensions. As discussed above, the buying decision may include a person, a business entity, a product or service, a price and terms, and a timeframe. Also, the interaction type may include relationship building, questioning, summarizing needs, presentation, determining a solution that satisfies the summarized needs, buyer action, ensuring buyer satisfaction, and delivering a product or service. In some embodiments, the buying decision or the interaction type is limited to the components enumerated herein. In other embodiments, the buying decision or the interaction type is described with an open-ended description, that is, there may be additional components included on either dimension.

At 804, the sales activity data is stored using a coordinate system that corresponds with the multi-dimensional matrix. For example, using the horizontal values as the x-axis and the vertical values as the y-axis, the values in the matrix illustrated in FIG. 5 may range from (1, 1) to (8, 5). In some embodiments, a zero-based numbering system is used, such that the range of components in the matrix illustrated in FIG. 5 may range from (0, 0) to (7, 4).

The method may further comprise analyzing the sales activity data and presenting the analysis of the sales activity data, in an embodiment. The method may further comprise using the sales activity data to track sales progress, in an embodiment. For example, coordinate data may be accumulated or aggregated using at least one of: a sales person, a sales department, a sales branch, a product, a service, a market, a sales manager, a time period, a client, or a client type. As an example, using various aggregations or accumulations, a sales manage may easily obtain an accurate, cross-department view of past, current, or pending sales situations. The client type may include a prospective client and an existing client, in an embodiment.

In an embodiment, the method may further comprise using the sales activity data to determine a recommended next step in the sales process. As an example, a business rules engine may be referenced to determine a best practice in light of the current context of a sales situation. The next step may then be determined using the business rule and the corresponding best practice. In a similar manner, the method may further comprise using the sales activity data to determine whether a sales activity corresponding with the sales activity data conforms to a best practice. The best practice may be associated with a sales situation, in various embodiments. The sales situation may be described using several factors, such as a business situation, a type of buyer, an influence in a decision process, a commitment level, a buying decision, a buying motive, an opportunity phase, an interaction type, an activity type, a personal style, and a product or service offering, in various embodiments.

Various post-processing steps or other workflow adjustments may be made after obtaining the sales activity data. For example, situation normalization and time cycle benchmarking, rollup for strategy confirmation and validation, improved forecasting for pipeline management, profile data collection and maintenance, verification of account and call strategy, interface to other business practices, improved communication, and training and developmental program support may be performed.

Hardware and Software Platform

Figure 9:
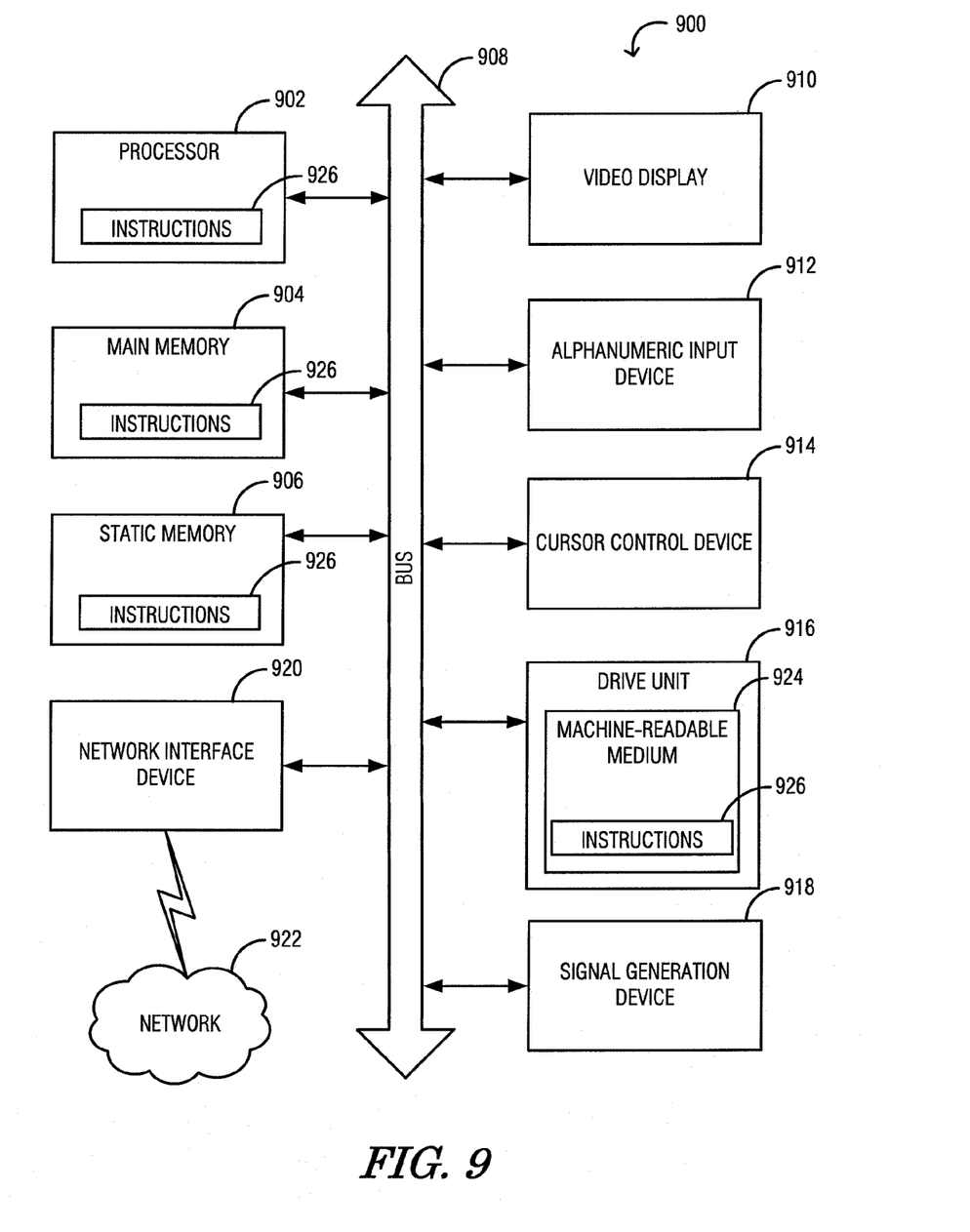
FIG. 9 is a block diagram illustrating a machine in the example form of a computer system, within which a set or sequence of instructions for causing the machine to perform any one of the methodologies discussed herein may be executed, according to various embodiments.

FIG. 9 is a block diagram illustrating a machine in the example form of a computer system 900, within which a set or sequence of instructions for causing the machine to perform any one of the methodologies discussed herein may be executed, according to various embodiments. In alternative embodiments, the machine may comprise a computer, a network router, a network switch, a network bridge, Personal Digital Assistant (PDA), a cellular telephone, a web appliance, set-top box (STB) or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920 to interface the computer system to a network 922.

The disk drive unit 916 includes a machine-readable medium 924 on which is stored a set of instructions or software 926 embodying any one, or all, of the methodologies described herein. The software 926 is also shown to reside, completely or at least partially, within the main memory 904 and/or within the processor 902. The software 926 may further be transmitted or received via the network interface device 920.

For the purposes of this specification, the term "machine-readable medium" or "computer-readable medium" shall be taken to include any medium which is capable of storing or encoding a sequence of instructions for execution by the machine and that cause the machine to perform any one of the methodologies. The terms "machine-readable medium" or "computer-readable medium" shall accordingly be taken to include, but not be limited to, solid-state memories, optical and magnetic disks, and other temporary, transient, or permanent storage means, such an executable streaming downloadable program. Further, it will be appreciated that the software could be distributed across multiple machines or storage media, which may include the machine-readable medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAM's), read only memories (ROM's), and the like.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. For example, one module may be implemented as multiple logical modules, or several modules may be implemented as a single logical module. As another example, modules labeled as "first," "second," and "third," etc., may be implemented in a single module, or in some combination of modules, as would be understood by one of ordinary skill in the art. Combinations of the above embodiments and other embodiments will be apparent to those of skill in the art upon reviewing the above description. The scope of the inventive subject matter should be determined with reference to the appended claims, along with the full scope of equivalents to which such claims are entitled.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims.

What is claimed is:

1. A system comprising:
a client system; and
a server system, communicatively coupled to the client system, wherein the server system comprises:
a client interface configured to receive sales activity data from the client system, wherein the sales activity data is associated with a sales process and arranged using a multi-dimensional matrix, wherein the multi-dimensional matrix comprises a first dimension representing an aspect of a buying decision and a second dimension representing an interaction type;
a data storage system configured to store the sales activity data in a transaction log using a coordinate system that corresponds with the multi-dimensional matrix;

an analysis module configured to analyze the sales activity data, by having the analysis module:
apply a check summing process that applies one or more rules that query the transaction log and obtains one or more missing field values to ensure that the sales activity data is complete;
post the sales activity data to a master transaction log after ensuring that the sales activity data is complete;
identify a sequence of coordinate geometry using the coordinate system and the sales activity data; and
determine whether an end point of the sequence of coordinate geometry triggers a change in the sales process; and
a presentation module configured to output the analysis of the sales activity data.

2. The system of claim 1, wherein the analysis module is further configured to use the sales activity data to track sales progress.

3. The system of claim 2, wherein the sales activity data is aggregated using at least one of: a sales person, a sales department, a sales branch, a product, a service, a market, a sales manager, a time period, a client, or a client type.

4. The system of claim 3, wherein the client type is a member selected from the group of: a prospective client and an existing client.

5. The system of claim 1, wherein the analysis module is further configured to use the sales activity data to determine a recommended next step in the sales process.

6. The system of claim 1, wherein the analysis module is further configured to use the sales activity data to determine whether a sales activity corresponding with the sales activity data conforms to a best practice.

7. The system of claim 6, wherein the best practice is associated with a sales situation.

8. The system of claim 7, wherein the sales situation is comprised of a plurality of factors, wherein the plurality of factors include a business situation, a type of buyer, an influence in a decision process, a commitment level, a buying decision, a buying motive, an opportunity phase, a interaction type, an activity type, a personal style, and a product or service offering.

9. The system of claim 1, wherein the aspect of the buying decision comprises a person, a business entity, a product or service, a price and terms, or a timeframe.

10. The system of claim 1, wherein the aspect of the buying decision consists of a person, a business entity, a product or service, a price and terms, and a timeframe.

11. The system of claim 1, wherein the interaction type comprises relationship building, questioning, summarizing needs, presentation, determining a solution that satisfies the summarized needs, buyer action, ensuring buyer satisfaction, or delivering a product or service.

12. The system of claim 1, wherein the interaction type consists of relationship building, questioning, summarizing needs, presentation, determining a solution that satisfies the summarized needs, buyer action, ensuring buyer satisfaction, and delivering a product or service.

13. The system of claim 1, wherein the client system comprises a mobile computing device.

14. The system of claim 13, wherein the mobile computing device comprises a personal digital assistant (PDA), a laptop computer, a specialized device, or a telephone.

15. The system of claim 1, wherein the first dimension representing the aspect of the buying decision is arranged on one axis and the second dimension representing interaction type is arranged on another axis in the multi-dimensional matrix, such that the sales activity data corresponds with an intersection of one or more aspects of the buying decision and one or more interaction types.

16. A method comprising:
receiving, at a server system, sales activity data from a client system, wherein the sales activity data is associated with a sales process and arranged using a multi-dimensional matrix, wherein the multi-dimensional matrix comprises a first dimension that represents an aspect of a buying decision and a second dimension that represents an interaction type;
storing the sales activity data in a transaction log using a coordinate system that corresponds with the multi-dimensional matrix;
analyzing the sales activity data by:
applying a check summing process that applies one or more rules that query the transaction log and obtains one or more missing field values to ensure that the sales activity data is complete;
posting the sales activity data to a master transaction log after ensuring that the sales activity data is complete;
identifying a sequence of coordinate geometry using the coordinate system and the sales activity data; and
determining whether an end point of the sequence of coordinate geometry triggers a change in the sales process; and
presenting the analysis of the sales activity data.

17. The method of claim 16, further comprising using the sales activity data to track sales progress.

18. The method of claim 17, wherein the sales activity data is aggregated using at least one of: a sales person, a sales department, a sales branch, a product, a service, a market, a sales manager, a time period, a client, or a client type.

19. The method of claim 18, wherein the client type is a member selected from the group of: a prospective client and an existing client.

20. The method of claim 16, further comprising using the sales activity data to determine a recommended next step in the sales process.

21. The method of claim 16, further comprising using the sales activity data to determine whether a sales activity corresponding with the sales activity data conforms to a best practice.

22. The method of claim 21, wherein the best practice is associated with a sales situation.

23. The method of claim 22, wherein the sales situation is comprised of a plurality of factors, wherein the plurality of factors include a business situation, a type of buyer, an influence in a decision process, a commitment level, a buying decision, a buying motive, an opportunity phase, a interaction type, an activity type, a personal style, and a product or service offering.

24. The method of claim 16, wherein the aspect of the buying decision comprises a person, a business entity, a product or service, a price and terms, or a timeframe.

25. The method of claim 16, wherein the aspect of the buying decision consists of a person, a business entity, a product or service, a price and terms, and a timeframe.

26. The method of claim 16, wherein the interaction type comprises relationship building, questioning, summarizing needs, presentation, determining a solution that satisfies the summarized needs, buyer action, ensuring buyer satisfaction, or delivering a product or service.

27. The method of claim 16, wherein the interaction type consists of relationship building, questioning, summarizing needs, presentation, determining a solution that satisfies the summarized needs, buyer action, ensuring buyer satisfaction, and delivering a product or service.

28. The method of claim 16, wherein the client system comprises a mobile computing device.

29. The method of claim 28, wherein the mobile computing device comprises a personal digital assistant (PDA), a laptop computer, a specialized device, or a telephone.

30. The method of claim 16, wherein the first dimension representing the aspect of the buying decision is arranged on one axis and the second dimension representing interaction type is arranged on another axis in the multi-dimensional matrix, such that the sales activity data corresponds with an intersection of one or more aspects of the buying decision and one or more interaction types.

31. A non-transitory computer-readable medium comprising instructions, which when executed on a computer, cause the computer to:
    receive, at a server system, sales activity data from a client system, wherein the sales activity data is associated with a sales process and arranged using a multi-dimensional matrix, wherein the multi-dimensional matrix comprises a first dimension that represents an aspect of a buying decision and a second dimension that represents an interaction type; and
    store the sales activity data in a transaction log using a coordinate system that corresponds with the multi-dimensional matrix;
    analyze the sales activity data by:
        applying a check summing process that applies one or more rules that query the transaction log and obtains one or more missing field values to ensure that the sales activity data is complete;
        posting the sales activity data to a master transaction log after ensuring that the sales activity data is complete;
        identifying a sequence of coordinate geometry using the coordinate system and the sales activity data; and
        determining whether an end point of the sequence of coordinate geometry triggers a change in the sales process; and
    present the analysis of the sales activity data.

* * * * *